US010086315B2

United States Patent
Richerand, Sr. et al.

(10) Patent No.: US 10,086,315 B2
(45) Date of Patent: Oct. 2, 2018

(54) MICRO-BUBBLE INDUCED GAS FLOTATION CELL AND METHOD OF OPERATING SAME

(71) Applicant: ENVIRO-TECH SYSTEMS, L.L.C., Folsom, LA (US)

(72) Inventors: Frank Richerand, Sr., Covington, LA (US); Frank Richerand, II, Folsom, LA (US); Yoosef Peymani, Mandeville, LA (US)

(73) Assignee: ENVIRO-TECH SYSTEMS, L.L.C., Folsom, LA (US)

( * ) Notice: Subject to any disclaimer, the term of this patent is extended or adjusted under 35 U.S.C. 154(b) by 471 days.

(21) Appl. No.: 14/735,869

(22) Filed: Jun. 10, 2015

(65) Prior Publication Data
US 2016/0009571 A1    Jan. 14, 2016

Related U.S. Application Data

(60) Provisional application No. 62/010,325, filed on Jun. 10, 2014.

(51) Int. Cl.
*B01D 21/00*    (2006.01)
*B01D 17/02*    (2006.01)
(Continued)

(52) U.S. Cl.
CPC ..... *B01D 21/0027* (2013.01); *B01D 17/0205* (2013.01); *B01D 17/0211* (2013.01);
(Continued)

(58) Field of Classification Search
CPC .................................................. B01D 21/0027
See application file for complete search history.

(56) References Cited

U.S. PATENT DOCUMENTS

| 4,971,731 A | 11/1990 | Zipperian |
| 5,156,745 A | 10/1992 | Cairo, Jr. et al. |

(Continued)

FOREIGN PATENT DOCUMENTS

| CN | 203373174 U | 1/2014 |
| GB | 2220594 A | 1/1990 |

(Continued)

OTHER PUBLICATIONS

Nicholas Owens and Douglas W. Lee, "The Use of Micro-Bubble Flotation Technology in Secondary & Tertiary Produced Water Treatment A Technical Comparison With Other Separation Technologies" (Reprint of paper presented at the Produced Water Workshop—Aberdeen, Scotland—May 2007).

(Continued)

*Primary Examiner* — Peter Keyworth
(74) *Attorney, Agent, or Firm* — Garvey, Smith & Nehrbass, Patent Attorneys, L.L.C.; Julia M. FitzPatrick; Gregory C. Smith

(57) ABSTRACT

A method and apparatus for separating two fluids, one lighter in specific gravity than the other, including the steps of providing a single vessel, having a primary separation chamber and a gas flotation chamber; separating fluids in the primary separation chamber to allow for free and suspended solids along with free oil and grease and gas to be removed from the fluids in the primary separation chamber; flowing the fluids into the gas flotation chamber portion; providing a first induced gas flow; combining a second gas flow of micro-bubbles with the first gas flow; and introducing the combined gas flow into the gas flotation chamber portion to provide a source of micro-sized dispersed bubbles in the fluid to accelerate the lift necessary for separation of fine oil droplets, emulsified oil droplets, from the water flowing in the flotation chamber portion. The apparatus for introducing the micro-bubbles to be comingled with the first induced gas flow includes a static mixer, a DGF pump, eductor and a series of globe valves which can be part of the gas flotation system or retrofitted to an existing gas flotation system.

9 Claims, 12 Drawing Sheets

(51) Int. Cl.
  *B01D 17/04* (2006.01)
  *C02F 1/24* (2006.01)
  *B03D 1/14* (2006.01)
  *B03D 1/24* (2006.01)
  *C02F 101/32* (2006.01)
  *B01D 21/02* (2006.01)

(52) U.S. Cl.
  CPC ........... *B01D 17/04* (2013.01); *B03D 1/1431* (2013.01); *B03D 1/24* (2013.01); *C02F 1/24* (2013.01); *B01D 21/10* (2013.01); *C02F 2101/32* (2013.01); *C02F 2303/26* (2013.01)

(56) References Cited

U.S. PATENT DOCUMENTS

| | | | |
|---|---|---|---|
| 5,275,732 | A | 1/1994 | Wang et al. |
| 5,382,358 | A | 1/1995 | Yeh |
| 8,080,158 | B2 | 12/2011 | Lee et al. |
| 8,196,750 | B2 | 6/2012 | Kanel et al. |
| 8,251,228 | B2 | 8/2012 | Clayton et al. |
| 8,834,723 | B1 | 9/2014 | Richerand et al. |
| 8,834,724 | B1 | 9/2014 | Richerand |
| 9,095,786 | B1 | 8/2015 | Richerand |
| 2005/0040548 | A1 | 2/2005 | Lee et al. |
| 2011/0297620 | A1 | 12/2011 | Lee et al. |
| 2012/0003707 | A1 | 1/2012 | Hickey et al. |
| 2012/0285892 | A1 | 11/2012 | Tuckett et al. |

FOREIGN PATENT DOCUMENTS

| | | |
|---|---|---|
| RU | 2079437 C1 | 5/1997 |
| RU | 2316478 C2 | 2/2008 |
| RU | 2320548 C2 | 3/2008 |
| RU | 73327 U1 | 5/2008 |
| RU | 2455079 C1 | 7/2012 |
| RU | 122304 U1 | 11/2012 |

OTHER PUBLICATIONS

PCT International Search Report and Written Opinion for international patent application serial No. PCT/US2015/035130.

MICRO-BUBBLE INDUCED GAS FLOTATION CELL AND METHOD OF OPERATING SAME

CROSS-REFERENCE TO RELATED APPLICATIONS

Priority of U.S. Provisional Patent Application Ser. No. 62/010,325, filed on 10 Jun. 2014, which is hereby incorporated herein by reference, is hereby claimed.

This application is related to pending U.S. Patent Application entitled "METHOD AND APPARATUS FOR SEPARATION OF FLUIDS WITHIN A SINGLE VESSEL," Ser. No. 13/208,852, filed on 12 Aug. 2011, which claims priority of U.S. Provisional Patent Application Ser. No. 61/449,289, filed on 4 Mar. 2011, each of which are fully incorporated herein by reference thereto.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

The apparatus and process of the present invention relates to Induced Gas Flotation (IGF) and Dissolved Gas Flotation (DGF). More particularly, the present invention relates to an apparatus and process in which micro-bubbles created by dissolved gas flotation assemble in conjunction with induced gas flotation macroscopic bubbles and improve the overall technique of flotation and/or removal.

General Background of the Invention

Currently, prior art gas flotation cells utilize a pump that mixes air and water in specific proportions to create macroscopic bubbles. The present invention comprises the addition of micro-bubbles to induced gas flotation macroscopic bubbles as an add on feature that is a novel and effective method to separate insoluble organics in produced/waste water.

The Enviro-Cell™ Induced Gas Flotation cell, under patent pending, of U.S. patent application Ser. No. 13/208, 852, is used to separate oil in produced water. It is generally efficient to approximately 95-97%. It is a common method to treat produced water and it meets the requirements set forth by the BOEMRE (Bureau of Ocean Energy Management, Regulation and Enforcement) and BSEE (Bureau of Safety and Environmental Enforcement) regulations for produced water discharges in the Gulf of Mexico. Considering that less than 29 parts per million (ppm) (0.029 mL/litre) is the requirement for discharge under the BSEE and BOEMRE, there is a need in the art to improve the overall efficiency and performance of an induced gas flotation cell.

The following U.S. patents and patent publications are incorporated herein by reference:

| Pat. No. | Title | Issue Date MM/DD/YYYY |
| --- | --- | --- |
| 4,971,731 | Method and Apparatus for Generating Microbubbles in Froth Flotation Mineral Concentration System | 11-20-1999 |
| 5,156,745 | Induced Gas Liquid Coalescer and Flotation Separator | 10-20-1992 |
| 5,382,358 | Apparatus for Dissolved Air Flotation and Similar Gas-Liquid Containing Operations | 01-17-1995 |
| 8,080,158 | Vessel and Method for Treating Contaminated Water | 12-20-2011 |
| 8,196,750 | Process and Apparatus for Absorptive Bubble Separation Using a Dense Form | 06-122012 |
| 8,251,228 | Process and Apparatus for Absorptive Bubble Separation | 08-28-2012 |
| 2005/0040548 | Apparatus and Method for Producing Small Gas Bubbles in Liquids | 02-24-2005 |
| 2011/0297620 | Method and Device for Converting Horizontal Tanks into Gas Flotation Separators | 12-08-2011 |
| 2012/0003707 | Method for Injecting A Feed Gas Stream Into a Vertically Extended Column of Liquid | 01-05-2012 |
| 2012/0285892 | Separation Process | 11-15-2012 |

BRIEF SUMMARY OF THE INVENTION

The present invention solves the problems in the art in a simple and straightforward manner. Considering that less than 29 parts per million (ppm) (0.029 mL/litre) is regulation, as set forth by BOEMRE and BESSE for discharge in the Gulf of Mexico, trying to improve the overall efficiency and performance of an Induced Gas Flotation (IGF) unit is the basis for advancement. Tests have been conducted with the addition of micro-bubbles into a prior art induced gas flotation cell to test if the combination of standard induced gas flotation technology with the addition of micro-bubbles, working in conjunction with another, improves the overall performance of an induced gas flotation cell.

The addition of properly placed micro-bubbles work in conjunction with traditional flotation bubbles as a compliment to the technology and improves the overall performance of either the new machine of the present invention or the existing prior art machines. The method of addition of these technologies is key to this enhancement working properly. Strategically placing these micro-bubbles in the unit and combined with the standard bubble improves the overall performance of an induced gas flotation cell.

In the present invention, a DGF (Dissolved Gas Flotation) system comprises a combination of multi-phase pump, low pressure eductor, high shear static mixer and a series of modified globe valves to create excessive shear and turbulence at the throat. In the apparatus and process of the present invention, the gas can be introduced to the process through adjustable gas suction which allows the operator to optimize the amount of gas to be injected into the vessel (which can be up to 30% of the pump capacity at standard conditions). The gas flows through a series of shearing stages, including the multi-stage centrifugal shearing pump, high turbulence in static mixer and extreme pressure drop and turbulence in globe valves. The process creates uniform bubbles (10-30 microns ($\mu$m)) which can float very small oil droplets with high efficiency. The combination of the DGF and IGF technologies can create a wide range of gas bubble sizes that will separate the smallest oil droplet in the system. Introducing micro-bubbles through a DGF pump in the first two cells of the vessel creates white cloudy water. These micro-bubbles can travel through the whole vessel and attach to the smallest oil droplets and assist the macro-bubbles created by IGF technology to float them to the water surface where they can be skimmed from the surface.

In a first embodiment, the present invention may be a standalone product or feature to be used as a DGF pump to introduce micro-bubbles to a new process or existing process or new machine or prior art existing machine and float contaminates to the surface.

In a second embodiment of the present invention a Dissolved Gas Flotation system is a combination of a DGF pump, low pressure eductor, static mixer and series of global valves, which are working in addition to a new IGF process ore existing IGF process or new IGF machine or existing IGF machine.

In a third embodiment of the present invention, a Dissolved Gas Flotation system may be installed in a new process or existing process or new machine or prior art existing machine as a product or feature addition utilized to enhance the separation efficiency by means of flotation. The third embodiment may retrofit microbubbles to any other vessel, e.g. addition of microbubbles and or Induced Gas Flotation to:
  Skimmer vessels
  Corrugated Plate Separators
  Enviro-Cell IGF
  Other manufacturers IGF
  Tanks, horizontal or vertical, cylindrical or square
  Atmospheric or Pressurized Therefore, a principal object of the present invention is to provide a DGF system, which can be retrofitted to any vessel available; can be operated at high temperature and moderate pressure; and can generate uniform micro-bubbles.

It is a further principal object of the present invention to provide a DGF system wherein the bubble size can be adjusted to optimize the separation efficiency; the gas flow rate can be controlled to optimize the agitation; the system can be utilized for flotation in pressurized vessels; and the system can significantly increase the separation efficiency.

It is a further object of the present invention to establish the operating parameters through laboratory experiments and field testing and quantify the efficiency improvement of the micro-bubbles in separation efficiency.

It is a further object of the present invention to enhance existing vessels that are being used for produced water or other water treatment operations and primarily for those that are not satisfactorily working to meet discharge requirements.

Various embodiments of the method of the present invention comprise a method of separating two immiscible components, one lighter in specific gravity than the other, comprising the following steps:
  providing a single vessel, having a primary separation chamber and a gas flotation chamber; separating component in the primary separation chamber to allow for free and suspended solids along with free oil or grease or gas to be removed from fluids in the primary separation chamber;
  flowing the two immiscible components into the gas flotation chamber portion;
  providing a first induced gas flow;
  combining a second gas flow of micro-bubbles with the first induced gas flow; and
  introducing the combined gas flow into the gas flotation chamber to provide a source of micro-sized dispersed bubbles in the fluid to accelerate the lift necessary for separation of fine oil droplets, emulsified oil droplets, from the fluid flowing in the flotation chamber portion.

In additional embodiments of the method of the present invention, micro-bubbles are comingled with first induced gas flow via a static mixer.

In additional embodiments of the method of the present invention, there is further provided a dissolved gas flotation pump, eductor and a series of globe valves as part of a dissolved gas flotation system.

Various embodiments of the apparatus of the present invention comprise an apparatus for separating two immiscible components, one lighter in specific gravity than the other, comprising:
  a single vessel, having a primary separation chamber portion for receiving fluids into the chamber;
  a gas flotation chamber portion of the vessel for receiving fluid flow from the primary separation chamber portion;
  a first source of induced gas flow; and
  a second source of micro-bubble gas flow combined with the first induced gas flow;
  eductor means for inducing the combined flow of gas into the fluid in the gas flotation chamber portion for separating fine oil droplets, emulsified oil droplets, and suspended solids from the fluid flow, to be collected separately from the fluid flow.

Additional embodiments of the apparatus of the present invention comprise a dissolved gas flotation pump, eductor and a series of globe valves operating with the gas flotation chamber to provide the source of micro-bubble flow into the chamber.

In additional embodiments of the apparatus of the present invention, components can be retrofitted to an existing flotation cell.

In additional embodiments of the apparatus of the present invention, the size of the micro-bubbles can be adjusted to optimize separation efficiency.

Various embodiments of the present invention comprise an improved apparatus for separating two immiscible components, one lighter in specific gravity than the other, which comprises a single vessel, having a primary separation chamber portion for receiving fluids into the chamber; a gas flotation chamber portion of the vessel for receiving fluid flow from the primary separation chamber portion; and a first source of induced gas flow; the improvement comprising:

a second source of micro-bubble gas flow combined with the first induced gas flow;

and eductor means for inducing combined flow of gas into fluid in the gas flotation chamber portion for separating fine oil droplets, emulsified oil droplets, and/or suspended solids from the fluid flow, to be collected separately from the fluid flow.

Various embodiments of the present invention comprise an improved method of separating two immiscible components, one lighter in specific gravity than the other, comprising the steps of providing a single vessel, having a primary separation chamber and a gas flotation chamber; separating immiscible components in the primary separation chamber to allow for free and suspended solids along with free oil or grease or gas to be removed from the fluids in the primary separation chamber; flowing the immiscible components into the gas flotation chamber portion; and providing a first induced gas flow; the improvement comprising the steps of:

combining a second gas flow of micro-bubbles with the first gas flow; and introducing the combined gas flow into the gas flotation chamber portion to provide a source of micro-sized dispersed bubbles in the fluid to accelerate the lift necessary for separation of fine oil droplets or emulsified oil droplets or grease or gas, from the water flowing in the flotation chamber portion.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
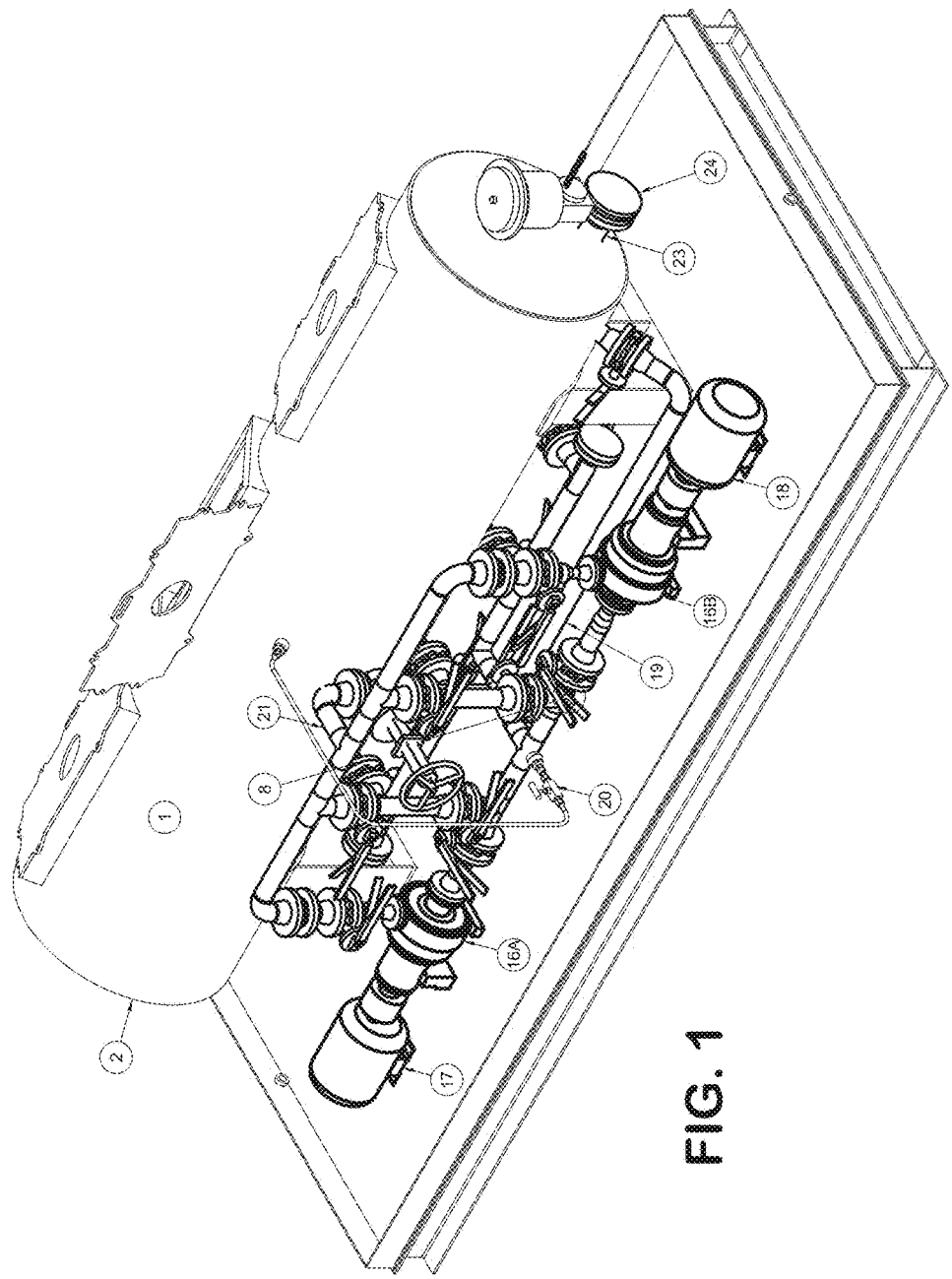
FIG. 1 illustrates an isometric view of a stand-alone DGF package in a first embodiment of the present invention.

Before reference is made to the drawing FIGS. 1-11, it shall be mentioned that a <29 ppm (<0.029 mL/litre) requirement for discharge is necessary under current BESSE and BOEMRE regulations for the Gulf of Mexico, and an object of the present invention is to improve the overall efficiency of the collection process.

Figure 2:
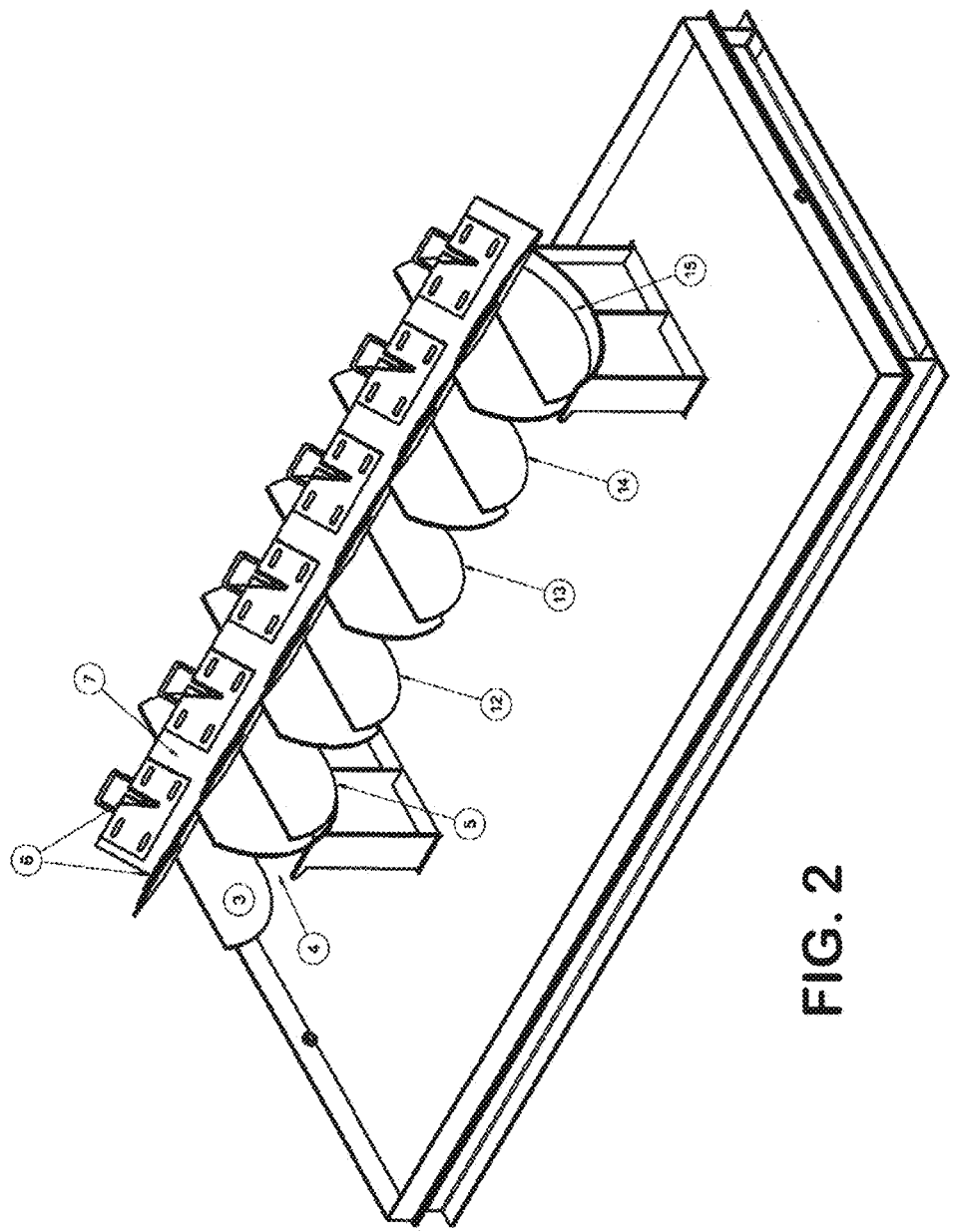
FIG. 2 illustrates an isometric view of the internal geometry of a stand-alone DGF package in a first embodiment of the present invention.
Figure 3:
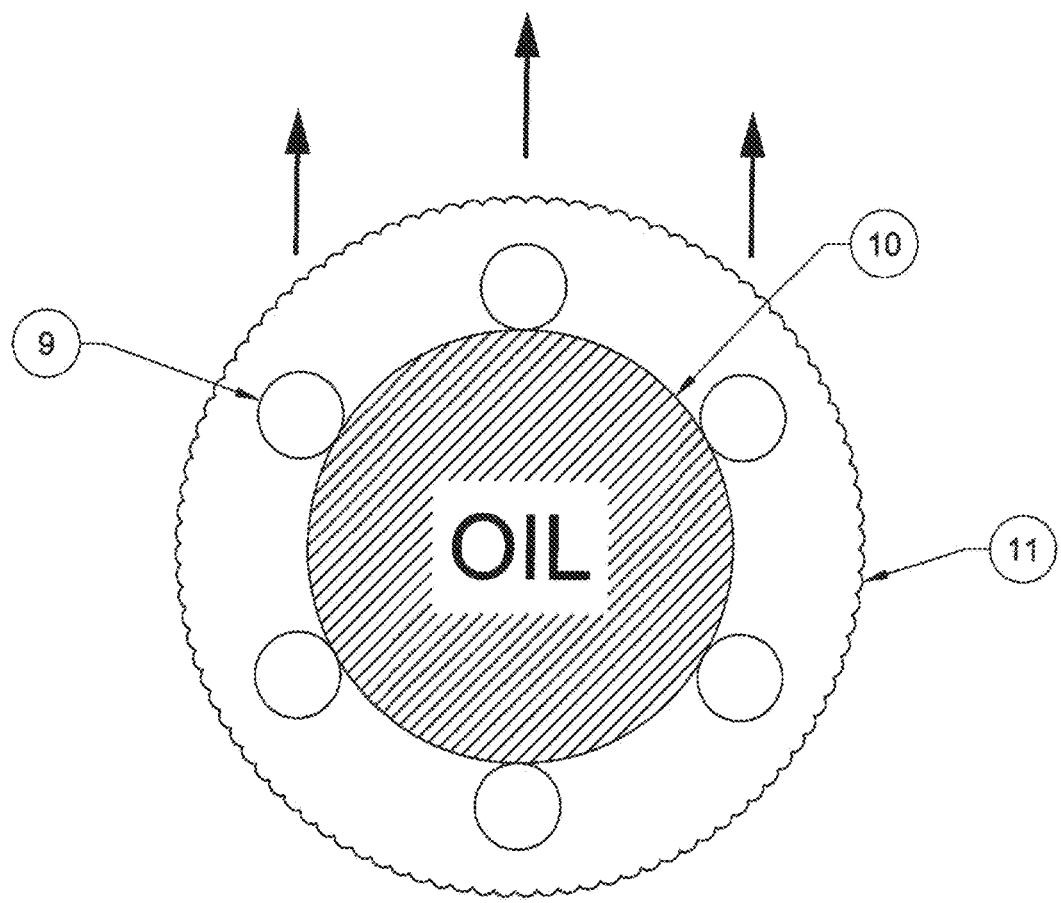
FIG. 3 illustrates the interaction between micro-bubbles and oil contaminates and consequent flotation, in a first embodiment of the present invention.
Figure 4A:
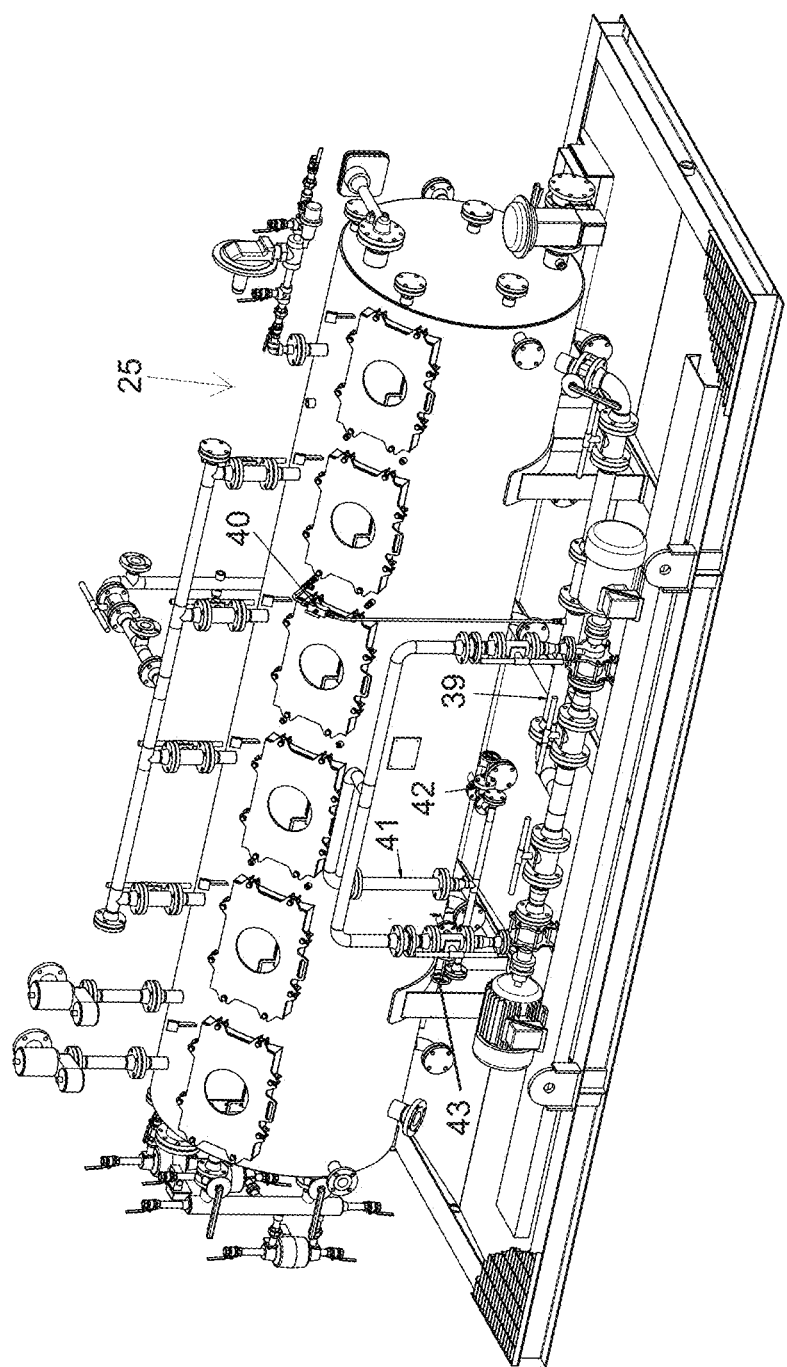
FIGS. 4A-4B illustrate isometric front and back side views of a combination IGF and DGF flotation system in one package, in a second embodiment of the present invention.
Figure 4B:
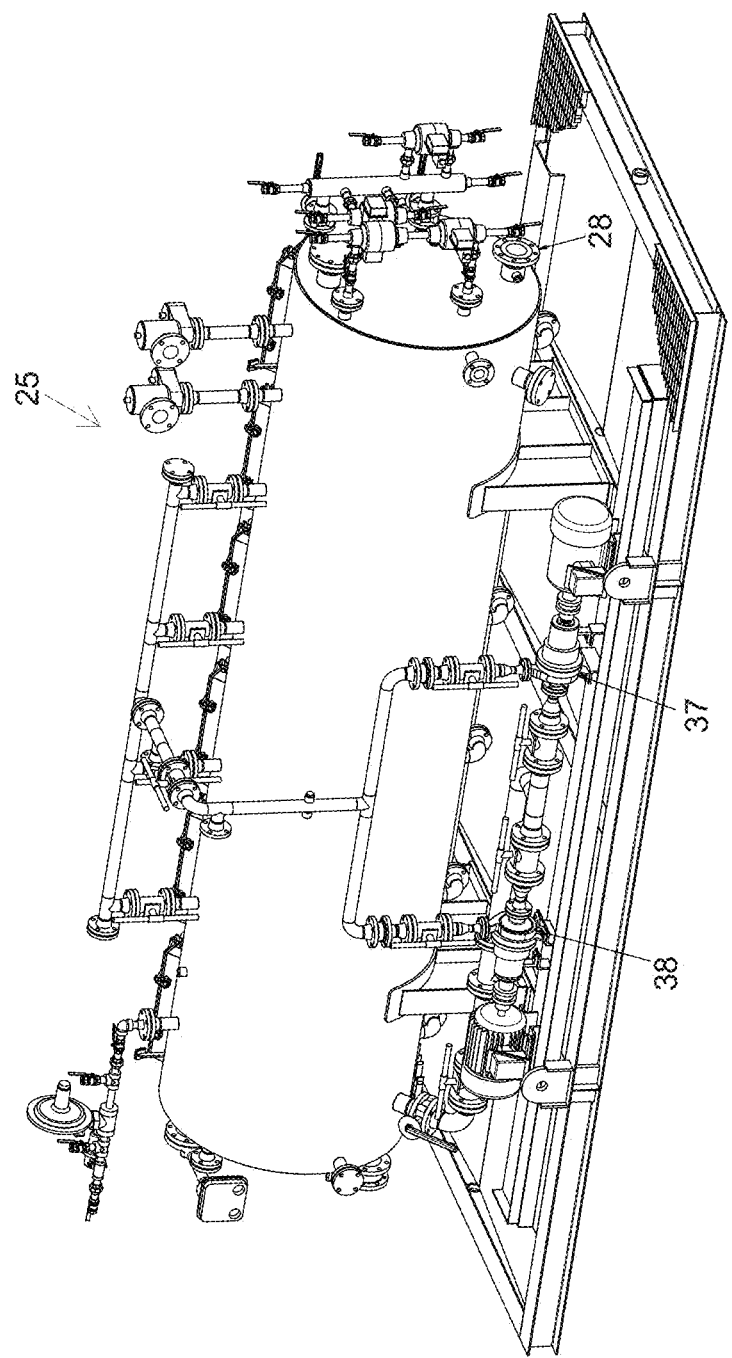
Figure 5:
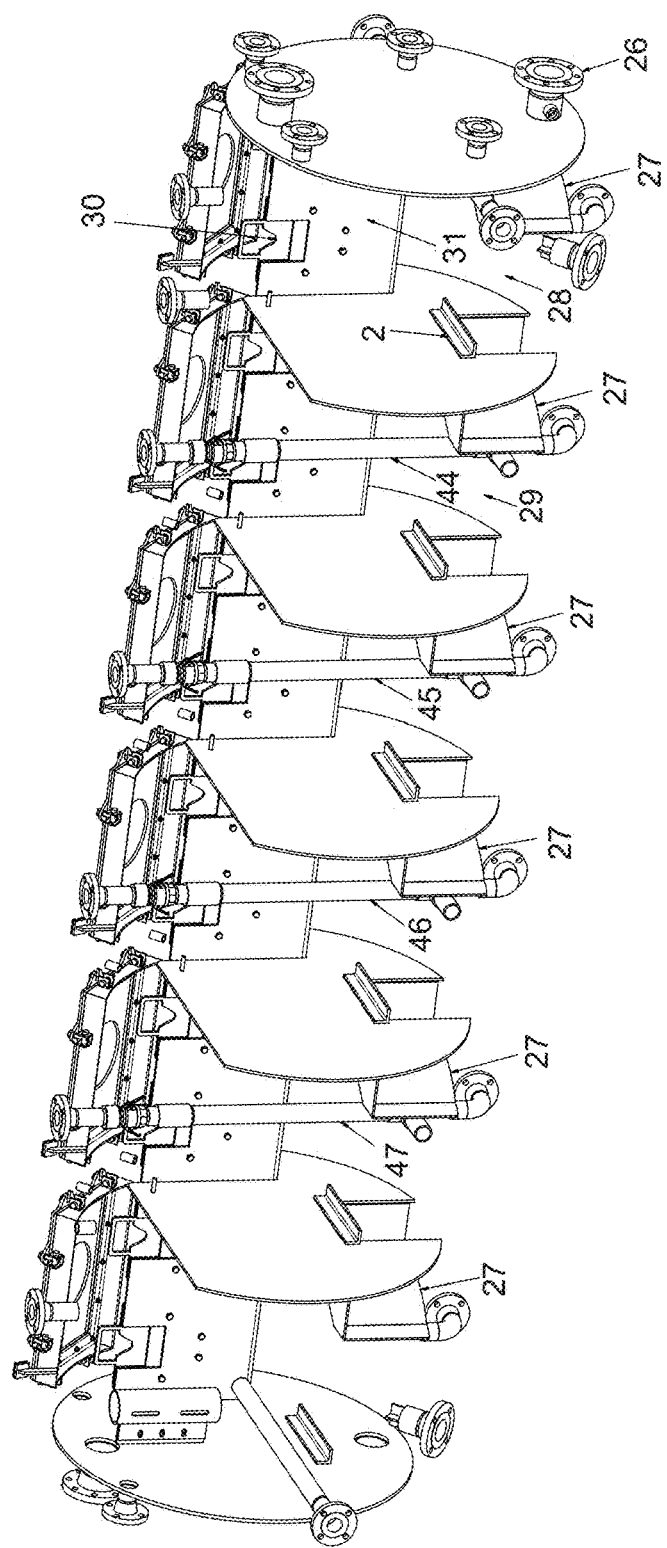
FIG. 5 illustrates an isometric view of a combination IGF and DGF flotation system internal design, in a second embodiment of the present invention.

In a first embodiment as shown in FIGS. 1-3 an isometric view of a micro-bubble flotation vessel 1 is illustrated. Contaminated water may enter the vessel 1 from inlet nozzle 2, wherein diverter plate 3 breaks the possible short-circuiting between quiescence cell 4 and first active cell 5. The separated oil spills over weirs 6 to oil bucket or collection reservoir 7. The processed water enters the first active cell 5, where microbubbles are injected from a bottom entry point 8. FIG. 3 illustrates the interaction between gas bubbles and oil droplets wherein microscopic gas bubbles 9 attach to oil droplets 10 and lower the parcel 11 density.

The process may be repeated in each active cell 12 to 14, and in a final stage the processed water is sent to a final quiescence cell 15 for further gravity separation. A portion of water may be recycled through DGF pumps 16A and 16B whereby the pumps 16A, 16B can be driven by electric motors 17 and 18, to create micro-bubbles for flotation purpose. The recycled water passes through low pressure eductor 19 which preferably creates enough suction to entrain up 30% gas in incoming water through a needle valve 20 from the gas blanket wherein the operator can control the gas percentage in the stream. The gas and water mixture goes through a series of centrifugal stages in a multiphase-side channel pump 16A or 16B. A standby multi-phase side channel pump 16B and operating multi-phase side channel pump 16A are provided in a preferred embodiment. The pressurization of gasified water along with high shear forces in the pump 16A or 16B dissolve a significant portion of gas in water. By passing the gasified water through high shear static mixer 21, the bubbles will break down to smaller size. As a final stage the small bubbles and dissolved gas in water pass through a globe valve 22 with a modified globe to create further shear. A significant pressure drop (e.g., a drop of 80-100 psig (6.53 bar-7.91 bar)) creates uniform microscopic bubbles. Processed water at the end exits the vessel 1, through outlet nozzle 23 where the level may be controlled by level control valve 24. The collected oil in oil collection reservoir 7 may be either pumped or gravity fed to the collection tank.

In a second embodiment of the present invention, illustrated in FIGS. 4A-6, the micro-bubble flotation is utilized as a compliment to an IGF unit, which may be a traditional prior art IGF unit, wherein macro-induced bubbles may be created through venturi type eductors. Contaminated water enters the vessel 25 from inlet nozzle 26, wherein a diverter plate 27 breaks the possible short-circuiting between first DGF cell 28 and first DGF+IGF cell 29 (see FIG. 5). Separated oil may spill over the weirs 30 to oil bucket or collection reservoir 31. Processed water enters the first IGF+DGF cell 29, wherein the microbubbles have been injected from tangential entry point 32 (see FIG. 4A).

Figure 6:
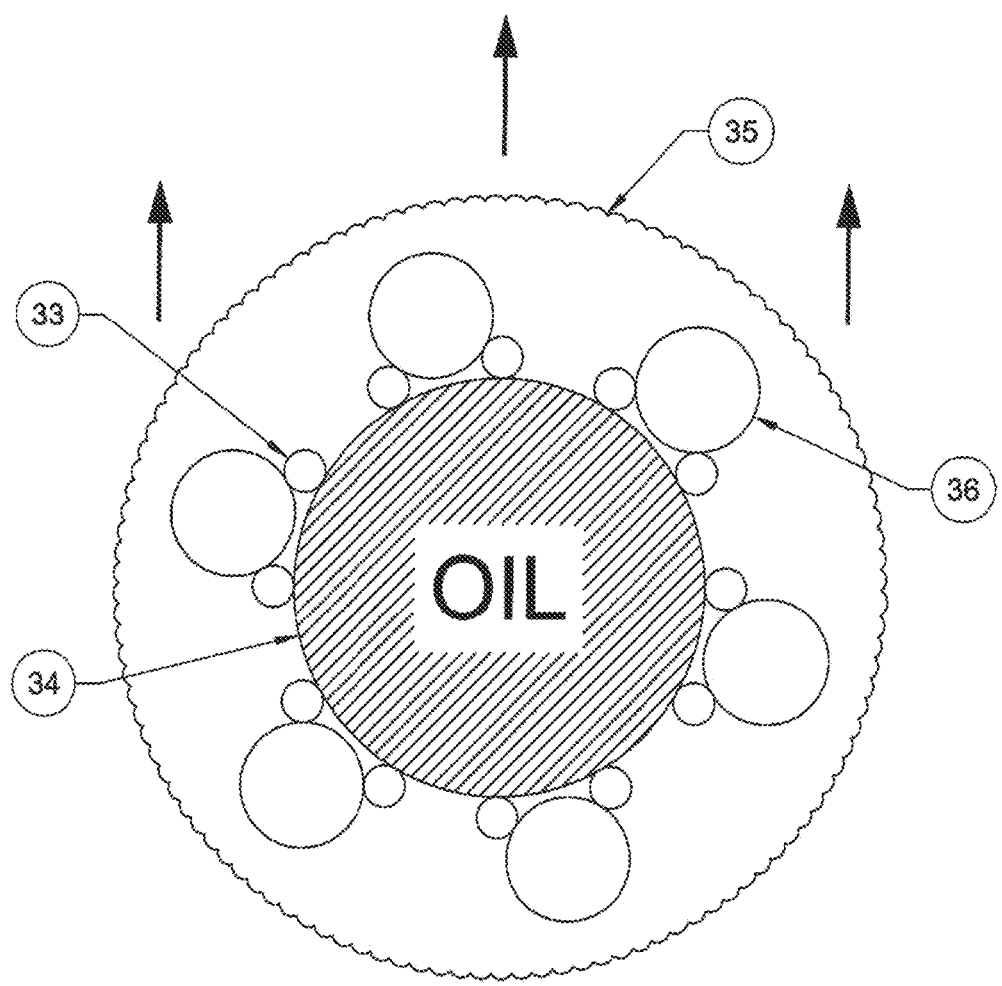
FIG. 6 illustrates the interaction between micro-bubbles, macro-bubbles and oil contaminates and consequent flotation in a second embodiment of the present invention.

FIG. 6 shows the interaction between gas bubbles and oil droplets wherein microscopic gas bubbles 33 may attach to oil droplets 34 and lower the parcel 35 density, and wherein macroscopic bubbles 36 employ the high Inter-Facial Tension (IFT) between microscopic and macroscopic bubbles, attach to the parcel of oil droplets and microbubbles, and rapidly bring them to the surface.

The process may be repeated in remaining active cells. This embodiment can be employed to gasify the early stages of the separation with combination of microscopic bubbles, or can be used to float the contaminates with micro-bubbles throughout an entire vessel. It is preferable to keep 1 minute minimum of the retention time after final DGF stage to prevent the gas bubbles from entering the suction of centrifugal pumps 37 and 38 and causing cavitation. Processed water from the final stage of vessel 25 may be recycled through IGF and DGF pumps. In DGF cycle the recycled water passes through low pressure eductor 39 which preferably creates enough suction to entrain up 30% gas in incoming water through a needle valve 40 from the gas blanket wherein the operator can control the gas percentage in the stream. Gas and water mixture goes through a series of centrifugal stages in a multiphase-side channel pump 37 and 38. In a preferred embodiment standby and operating multi-phase side channel pumps 37 and 38 are provided. The pressurization of gasified water along with high shear forces in the pump can dissolve a significant portion of gas in water. By passing the gasified water through high shear static mixer 41, the bubbles may break down to smaller size. As a final stage, the small bubbles and dissolved gas in water may pass through globe valves 42 and 43, which have modified globes to create further shear. A significant pressure drop (for example 80-100 psig (6.53 bar-7.91 bar)) may create uniform microscopic bubbles. In the IGF cycle, water is pressurized through centrifugal pumps 37 and 38, and sent to multiple venturi type eductors 44-47 which enable creation of macro-bubbles in the active cells. (See U.S. patent application Ser. No. 13/208,852 for additional detail on this process). The collected oil in oil collection reservoir 31 may be either pumped or gravity fed to the collection tank.

Figure 7:
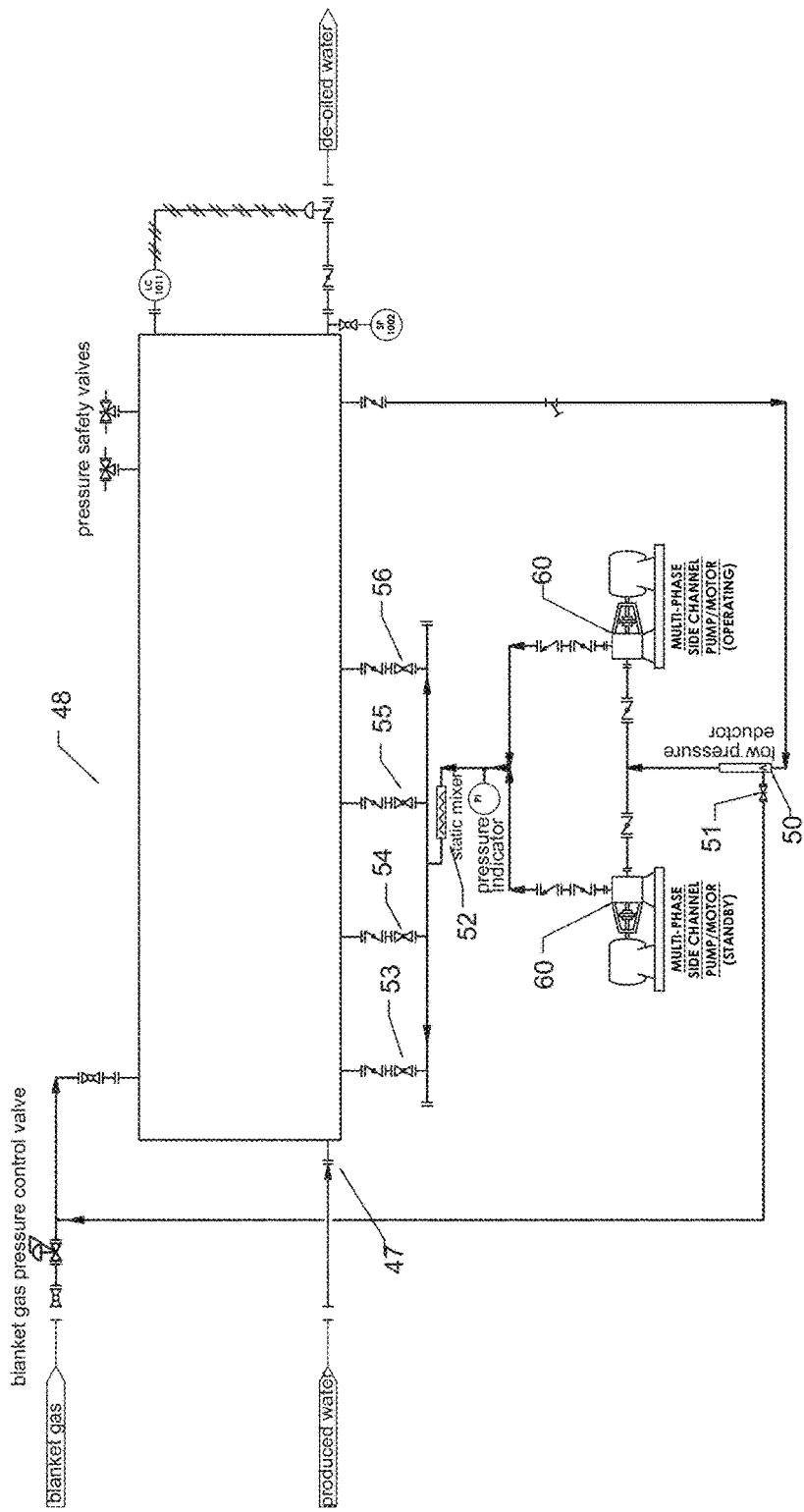
FIG. 7 illustrates a process flow diagram of a third embodiment of the present invention, and installation procedure of a retro-fitted DGF pump to an existing vessel.

Turning now to a third embodiment of the present invention, reference is made FIG. 7. A DGF pump assembly 60 can be retrofitted to any vessel atmospheric or pressurized vessel (preferably with an operating pressure less than 50 psig (4.46 bar)). FIG. 7 represents the installation configuration of a DGF pump assembly 60 on an atmospheric pressurized vessel 48 to enhance the separation efficiency by the addition of micro bubbles in the system. As processed water enters the vessel 48 from inlet nozzle 49, it interacts with microscopic gas bubbles which attach to oil and increase the pace of rise of oil droplets to the surface. Processed water from close to the end of vessel 48 may be recycled through DGF pumps 60. In DGF cycle, the recycled water may preferably be passed through low pressure eductor 50 which preferably creates enough suction to entrain up 30% gas in incoming water through the needle valve 51 from the gas blanket wherein the operator can control the gas percentage in the stream. Gas and water mixture goes through a series of centrifugal stages in an operating multiphase-side channel pump 60. A standby multi-phase pump/motor may also be provided in a preferred embodiment as illustrated in FIG. 7. The pressurization of gasified water along with high shear forces in the pump may dissolve a significant portion of gas in water. By passing the gasified water through high shear static mixer 52, the bubbles can break down to smaller size. As a final stage, the smaller bubbles and dissolved gas in water can pass through a series of globe valves 53-56 with a modified globe to create further shear. A significant pressure drop (for example 80-100 psig (6.53 bar-7.91 bar)) across the globe valve creates uniform microscopic bubbles which helps the flotation of bubbles to the surface wherein they may be skimmed off, for example, by use of a mechanical or hydraulic or other suitable skimmer system.

As stated earlier, with an object of the present invention being to improve the overall efficiency of the collection process, tests have been conducted including the addition of micro bubbles into an existing enviro-cell induced gas flotation cell to test whether the combination of standard induced gas flotation technology combined with the addition of small micro-bubbles working simultaneously will improve the overall performance of both a new unit of the present invention and an IGF unit, which may be a prior art IGF unit, by way of adding micro-bubbles. It is foreseen that the enhancement of micro bubbles properly placed will function in conjunction with traditional flotation bubbles as a compliment to the technology and improve the overall performance of either a new machine or an existing machine including microbubbles. The method of addition of these technologies is important to this enhancement working properly.

Figure 8:
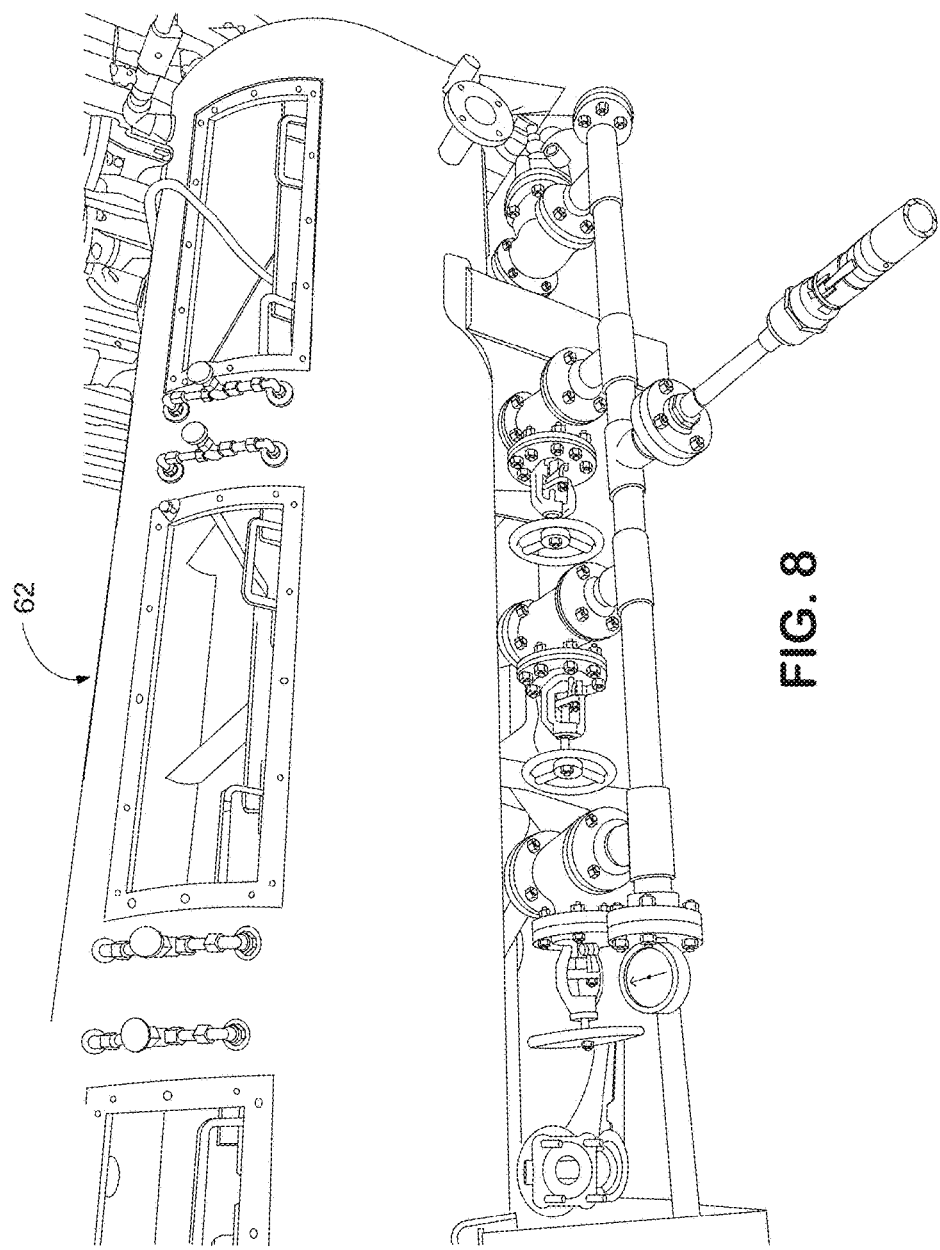
FIGS. 8 illustrates a micro-bubble layer test setup in combination with an IGF machine in a first embodiment of the present invention.
Figure 9:
FIGS. 9 illustrates a micro-bubble layer in combination of IGF bubbles at the top of an IGF machine in a first embodiment of the present invention.
Figure 10:
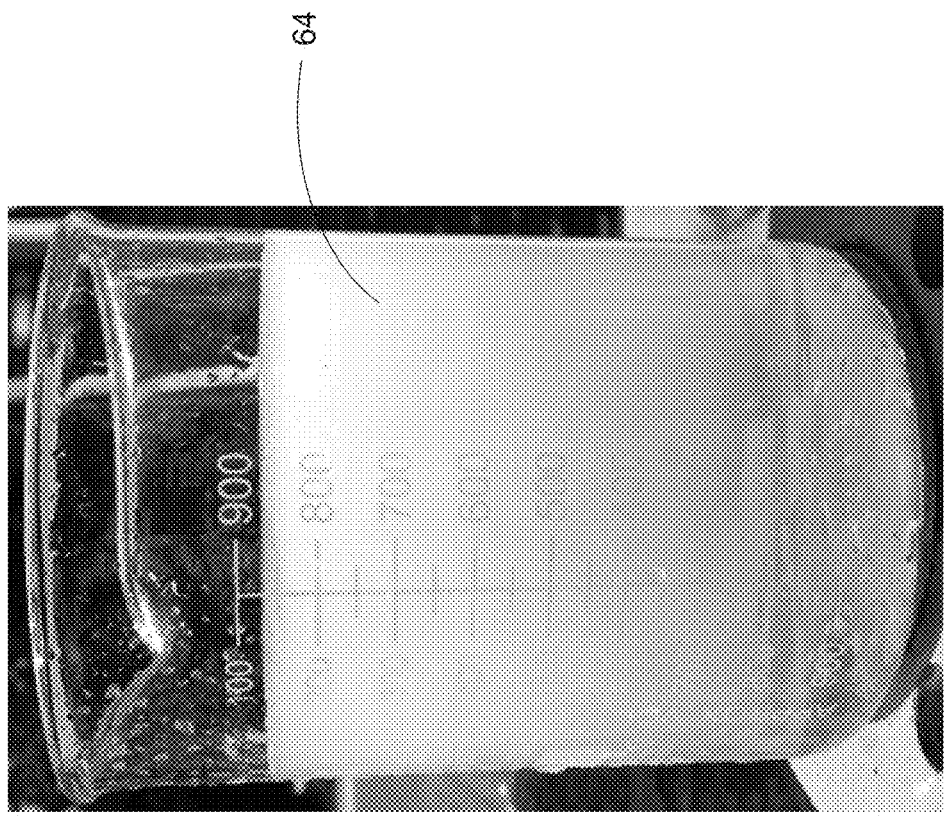
FIGS. 10 illustrates a micro-bubble specimen of micro-bubble layer in a beaker.

Turning now to FIGS. 8-9, a dissolved gas flotation (DGF) pump (not shown) is added to an induced gas flotation (IGF) cell 62, of the type known and marketed under the trademark Enviro-Cell™. FIG. 8 shows a field test setup which was described with regard to the first embodiment. During this process, the micro-bubbles 63 travel upward through contaminated water and minute droplets of oil attach to the micro-bubbles 63 and travel to the top of the fluid layer, and reside as a white foam 64 of micro-bubble/flotation gas containing oil, as seen in FIG. 9. There is also illustrated the micro-bubble foam 64 as in FIG. 10, as they would appear in a specimen in a beaker. The water with the oil collected via the micro-bubbles would travel to the last chamber in the IGF, where it would be discharged from the last drain (not shown).

Figure 11:
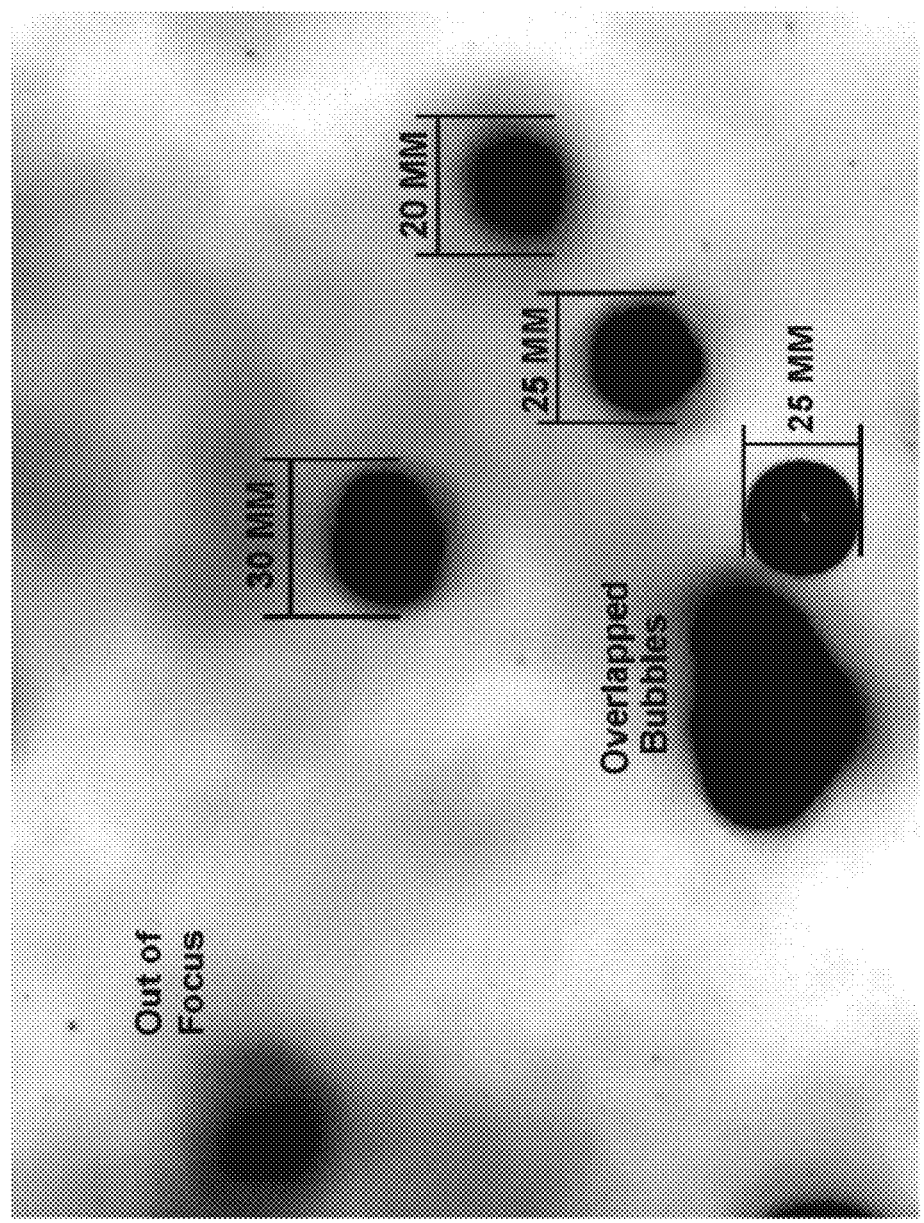
FIGS. 11 illustrates a microscopic picture of micro bubbles using an on-line high speed digital camera with a magnification lens, then utilizing image processing and object recognition to determine the size and number of micro-bubbles in line.

FIG. 11 illustrates an online microscopic size analysis of some micro-bubbles created with a method as illustrated in the second embodiment. Showing a bubble size of average 25 microns (μm).

Some advantages of micro-bubble technology of the present invention are described below:

The process described in the second embodiment can be retrofitted to any flotation cell available now or any suitable flotation cell developed in the future.

The process described in the third embodiment can be retrofitted to any pressurized/atmospheric vessel.

The process described in all embodiments can be operated at high temperature

The process described in all embodiments generates uniform micro-bubbles.

In all embodiments the bubble size can be adjusted to optimize the separation efficiency.

In all embodiments the gas flow rate can be controlled to optimize the agitation rate.

PARTS LIST

| Number | Description |
|---|---|
| 1 | micro bubble flotation vessel |
| 2 | inlet nozzle |
| 3 | diverter plate |
| 4 | first quiescence cell |
| 5 | first active cell |
| 6 | weirs |
| 7 | oil bucket/oil collection reservoir |
| 8 | bottom entry point |
| 9 | gas bubbles |
| 10 | oil droplets |
| 11 | gas bubbles/oil droplet parcel |
| 12 | second active cell |
| 13 | third active cell |
| 14 | fourth active cell |
| 15 | last quiescence cell |
| 16A | operating pump |
| 16B | standby pump |
| 17 | electronic motor |
| 18 | electronic motor |
| 19 | low pressure eductor |
| 20 | needle valve |
| 21 | high shear static mixer |
| 22 | globe valve |
| 23 | outlet nozzle |
| 24 | level control valve |
| 25 | second embodiment vessel |
| 26 | inlet nozzle |
| 27 | diverter plate |
| 28 | DGF cell |
| 29 | DGF + IGF cell |
| 30 | weirs |
| 31 | oil bucket |
| 32 | tangential entry point |
| 33 | microscopic gas bubbles |
| 34 | oil droplets |
| 35 | micro/macro bubbles and oil droplet parcel |
| 36 | macroscopic bubbles |
| 37 | operating centrifugal pumps |
| 38 | standby centrifugal pumps |
| 39 | pressure eductor |
| 40 | needle valve |
| 41 | high shear static mixer |
| 42 | modified globe valve |
| 43 | modified globe valve |
| 44 | venturi type eductors |
| 45 | venturi type eductors |
| 46 | venturi type eductors |
| 47 | venturi type eductors |
| 48 | atmospheric pressurized vessel with DGF system |
| 49 | inlet nozzle |
| 50 | low pressure eductor |
| 51 | needle valve |
| 52 | high pressure static mixer |
| 53 | modified globe valve |
| 54 | modified globe valve |
| 55 | modified globe valve |
| 56 | modified globe valve |
| 60 | multiphase-side channel pump |
| 62 | IGF cell retrofitted with DGF system |
| 63 | micro bubbles |
| 64 | micro bubble foam |
| 65 | micro bubble chamber |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A method of separating at least two immiscible components of a fluid, one lighter in specific gravity than the other, comprising the following steps:
   providing a single vessel having a primary separation chamber, a gas flotation chamber, and a separating component in the primary separation chamber to allow for at least some free and suspended solids along with free oil or grease or gas to be removed from the fluid in the primary separation chamber;
   flowing the fluid into the primary separation chamber;
   flowing the fluid from the primary separation chamber to the gas flotation chamber;
   providing a first induced gas flow of macro-bubbles;
   combining a second gas flow of micro-bubbles with the first induced gas flow of macro-bubbles to provide a combined gas flow; and
   introducing the combined gas flow into the fluid in the gas flotation chamber to provide a source of micro-sized dispersed bubbles to create an intermediate layer around the oil droplets which improves the adherence of macro-sized dispersed bubbles to free and emulsified oil droplets in the fluid, which accelerates the lift necessary for separation of fine oil droplets, and emulsified oil droplets from the fluid flowing in the gas flotation chamber.

2. The method in claim 1, wherein the micro-bubbles are commingled with the first induced gas flow via a static mixer.

3. The method in claim 1, wherein there is further provided a dissolved gas flotation pump, eductor and a series of globe valves as part of a dissolved gas flotation system.

4. The method in claim 1, wherein a source for adding the second gas flow of micro-bubbles is added to an existing gas flotation chamber to improve separation efficiency.

5. The method in claim 1, wherein a size of micro-bubbles in the second gas flow of micro-bubbles is adjustable, and wherein the size of the micro-bubbles is adjusted as desired to optimize separation efficiency by adjusting gas flow rate and pump pressure.

6. The method in claim 4, wherein the source for adding the second gas flow of micro-bubbles is a dissolved gas flotation pump, an eductor and a series of globe valves operating with the gas flotation chamber.

7. The method of claim 1 wherein the combined gas flow introduced into the fluid in the gas flotation chamber enables micro-sized dispersed bubbles and macro-sized dispersed bubbles to work simultaneously in the fluid to accelerate the lift necessary for separation of fine oil droplets and/or emulsified oil droplets from the fluid flowing in the gas flotation chamber.

8. An improved method of separating two immiscible components, one lighter in specific gravity than the other, comprising the steps of:
   providing a single vessel, having a primary separation chamber and a gas flotation chamber;
   flowing fluid having at least two immiscible components into the primary separation chamber;
   separating at least a portion of the at least two immiscible components in the primary separation chamber to allow for free and suspended solids along with free oil or grease or gas to be removed from the fluid in the primary separation chamber;

flowing the fluid from the primary separation chamber into the gas flotation chamber;

providing a first induced gas flow of macro-bubbles;

combining a second gas flow of micro-bubbles with the first induced gas flow of macro-bubbles to provide a combined gas flow; and introducing the combined gas flow into the fluid in the gas flotation chamber including to provide a source of micro-sized dispersed bubbles and macro-sized dispersed bubbles that work simultaneously in the fluid to improve the adherence to oil droplets and to accelerate the lift necessary for separation of fine oil droplets or emulsified oil droplets or grease from the fluid flowing in the gas flotation chamber.

9. A method of separating at least two immiscible components, one lighter in specific gravity than the other, in a fluid, comprising the following steps:

flowing the fluid having the at least two immiscible components into a gas flotation chamber;

combining a first gas flow of macro-bubbles with a second gas flow of micro-bubbles to provide a combined gas flow; and introducing the combined gas flow into the fluid in the gas flotation chamber to provide a source of micro-sized dispersed bubbles and macro-sized dispersed bubbles that work together in the fluid to improve the adherence to oil droplets and accelerate the lift necessary for separation of fine oil droplets or emulsified oil droplets or grease from the fluid in the gas flotation chamber.

* * * * *